Oct. 27, 1970        D. B. ANDERSON        3,537,020

OPTICAL PARAMETRIC DEVICE

Filed June 17, 1968        7 Sheets-Sheet 1

*INVENTOR.*
DEAN B. ANDERSON

BY Howard A. Silber

ATTORNEY

INVENTOR.
DEAN B. ANDERSON

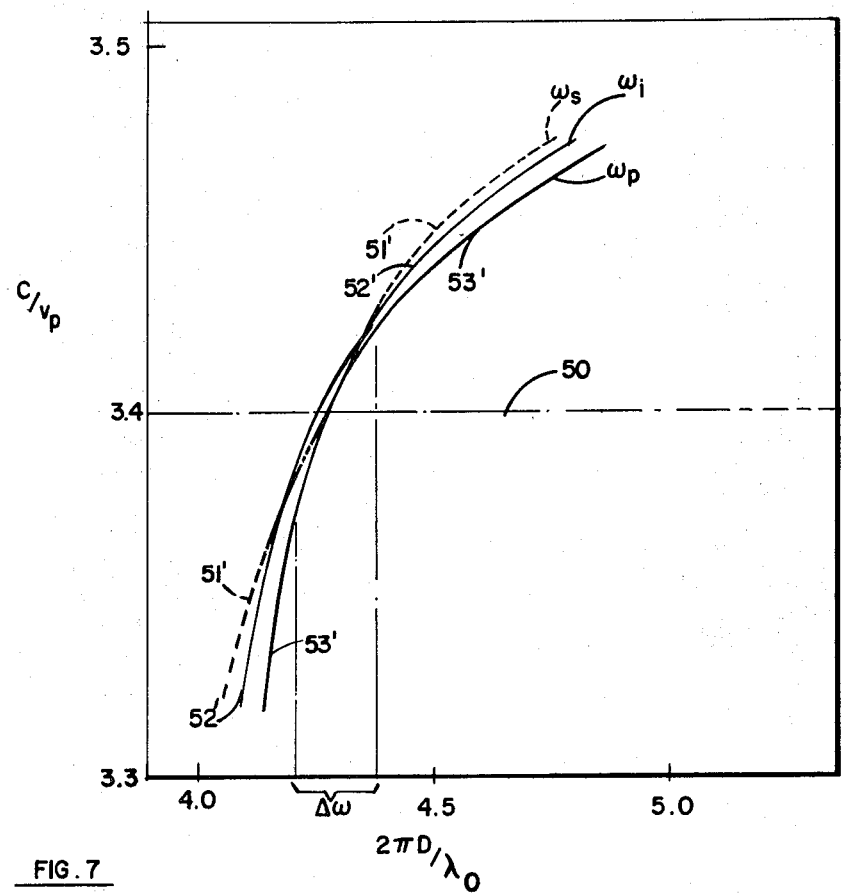
FIG. 7
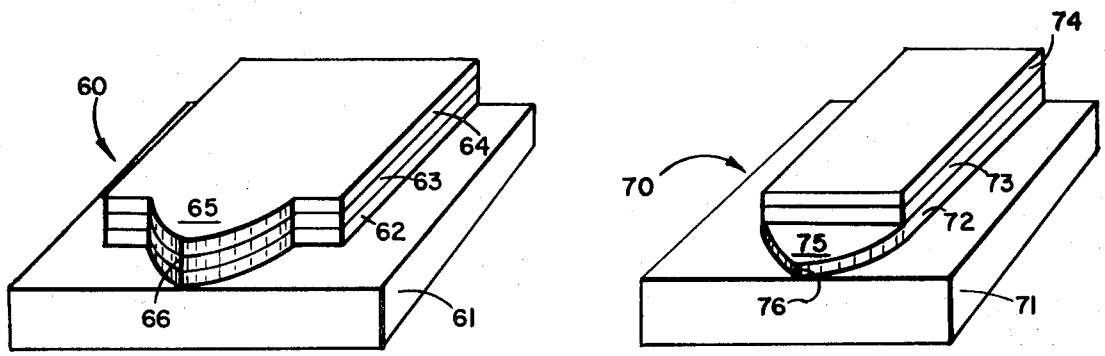
FIG. 10
FIG. 11
INVENTOR.
DEAN B. ANDERSON
BY Howard A. Silber
ATTORNEY Oct. 27, 1970  D. B. ANDERSON  3,537,020
OPTICAL PARAMETRIC DEVICE
Filed June 17, 1968  7 Sheets-Sheet 7

INVENTOR.
DEAN B. ANDERSON
BY Howard A. Silber
ATTORNEY

United States Patent Office 3,537,020
Patented Oct. 27, 1970

3,537,020
OPTICAL PARAMETRIC DEVICE
Dean B. Anderson, Whittier, Calif., assignor to North American Rockwell Corporation
Filed June 17, 1968, Ser. No. 737,526
Int. Cl. H03f 7/00
U.S. Cl. 330—4.5                               6 Claims

ABSTRACT OF THE DISCLOSURE

An optical parametric device comprising a dielectric waveguide, dispersion characteristics of which are controlled by appropriate selection of effective refractive index profile. In a preferred embodiment, the device comprises a three-layered dielectric waveguide, at least one layer of which exhibits nonlinear susceptibility. The layers are selected to achieve waveguide dispersion characteristics such that a signal in a first mode, a pump in a second mode and an idler in a third mode all will be propagated with the same phase velocity within the guide. In an alternative embodiment, wherein one or more of the layers comprises a birefringent material, the effective waveguide dispersion characteristics will be different for signal and pump introduced in different modes.

BACKGROUND OF THE INVENTION

Field of the invention

The present invention relates to an optical parametric device. More particularly, the invention relates to a device comprising a dielectric waveguide wherein parametric interaction at a selectable set of frequencies may be achieved by appropriate control of the guide refractive index profile.

Description of the prior art

In the past, frequency selection in optical parametric devices has been very limited. For example, early experimenters achieved parametric interaction by introducing signal and pump as the ordinary and extraordinary waves respectively in a single birefringent crystal wherein the birefringence exceeds the dispersion. Parametric interaction occurred, but was limited principally to second harmonic generation and quasi-degenerate parametric oscillation at frequencies entirely determined by inherent properties of the crystal used.

Parametric interaction also has been proposed in a nonlinear dielectric optical fiber comprising a glass inner core having a first index of refraction surrounded by a clading having a different index of refraction. The proposed device makes use of anomalous dispersion to achieve the matched phase velocity condition required for parametric interaction. For this reason, at least one of the parametric frequencies is constrained to correspond to a resonant phenomenon within the material used.

A more satisfactory approach to control of the frequency at which parametric interaction would occur is set forth in the inventor's co-pending application entitled Optical Parametric Device, Ser. No. 605,443, filed Dec. 28, 1966. As described therein, parametric interaction is accomplished utilizing the depletion layer associated with a p–n junction as a dielectric waveguide. By appropriate control of the bias voltage across the junction, the depletion layer thickness itself may be adjusted thereby permitting some control over the frequencies which will propagate with the same phase velocity in the waveguide.

The present invention permits very wide control of the frequencies at which travelling wave parametric interaction can occur, and also permits fabrication of broad-band optical parametric devices. In the inventive devices, the operational frequencies are not limited to those dictated by the crystallographic properties of the materials used.

SUMMARY OF THE INVENTION

In accordance with the present invention, there is set forth a travelling wave optical parametric device utilizing a dielectric waveguide. In a preferred embodiment, the waveguide comprises a three-layered structure at least one layer of which exhibits nonlinear susceptibility. By appropriate selection of the refractive index profile (that is, of the refractive index and thickness of each layer comprising the waveguide) control of the frequencies at which parametric interaction can occur may be obtained.

For utilization of the device, a signal is introduced into one end of the waveguide at a frequency $\omega_s$, and in a first mode. A pump is introduced at frequency $\omega_p$ in a second mode, thereby giving rise within the waveguide to a sideband at frequency $\omega_i = \omega_p \pm \omega_s$. The modes of the signal, pump and idler must be such that they will be propagated at the same phase velocity within the waveguide.

Since the shape of the waveguide dispersion curves is effected by the refractive index profile of the device, selection of the profile permits control of frequencies and modes at which parametric interaction is possible. Further, if at least two layers of the waveguide exhibit different indices of refraction, the corresponding dispersion curves will exhibit inflections; the slopes of the dispersion curves for different modes will be different in the region of such inflection. This anomaly permits broadband parametric interaction.

In another embodiment, at least one of the layers of the dielectric waveguide may comprise a birefiringent material. In this instance, the refractive index profile of the waveguide will be different depending on whether a TE or TM mode signal is being propagated thereby. Thus, if signal and pump are introduced in different modes, they will see different effective dispersion characteristics, thus permitting yet another degree of freedom in the selection of frequencies at which parametric interaction can occur.

By appropriately tapering an end of the waveguide, mode conversion of an incident signal can be achieved.

Thus, it is an object of the present invention to provide an improved optical parametric device.

Another object of the present invention is to provide a travelling wave parametric device comprising a dielectric waveguide.

Yet another object of the present invention is to provide a travelling wave parametric device utilizing a multi-layered dielectric waveguide.

It is another object of the present invention to provide a dielectric waveguide, the refractive index profile of which may be controlled to permit selection of the frequencies at which parametric interaction can occur.

A further object of the present invention is to provide an optical parametric device comprising a three-layered dielectric waveguide.

Still a further object of the present invention is to provied a technique for controlling the dispersion characteristics of a dielectric waveguide.

It is a further object of the present invention to provide a traveling wave parametric device in which at least one layer comprises a birefringent material.

Yet a further object of the present invention is to provide a broadband optical parametric device.

A still further object of the present invention is to provide an optical parametric device in which light having a range of frequencies may be propagated with the same phase velocity.

Yet another object of the present invention is to provide techniques for mode conversion of light entering a dielectric waveguide.

BRIEF DESCRIPTION OF THE DRAWINGS

Still other objects, features, and attendant advantages of the present invention will become apparent to those skilled in the art from a reading of the following detailed description of the preferred embodiments constructed in accordance therewith, taken in conjunction with the accompanying drawings wherein like numerals designate like parts in the several figures and wherein:

FIG. 7 is a fragmentary graph of the dispersion characteristics also shown in FIG. 5; in this view, three of the curves, plotted at corrected scale factors, are superimposed to allow direct comparison of their slopes.

FIG. 10 is a perspective view of another embodiment of the inventive optical parametric device employing a dielectric waveguide having a tapered end adapted for mode conversion.

FIG. 11 is yet another embodiment of the present invention utilizing a dielectric waveguide having a tapered end adapted for mode conversion.

DESCRIPTION OF THE PREFERRED EMBODIMENTS

Figure 1:
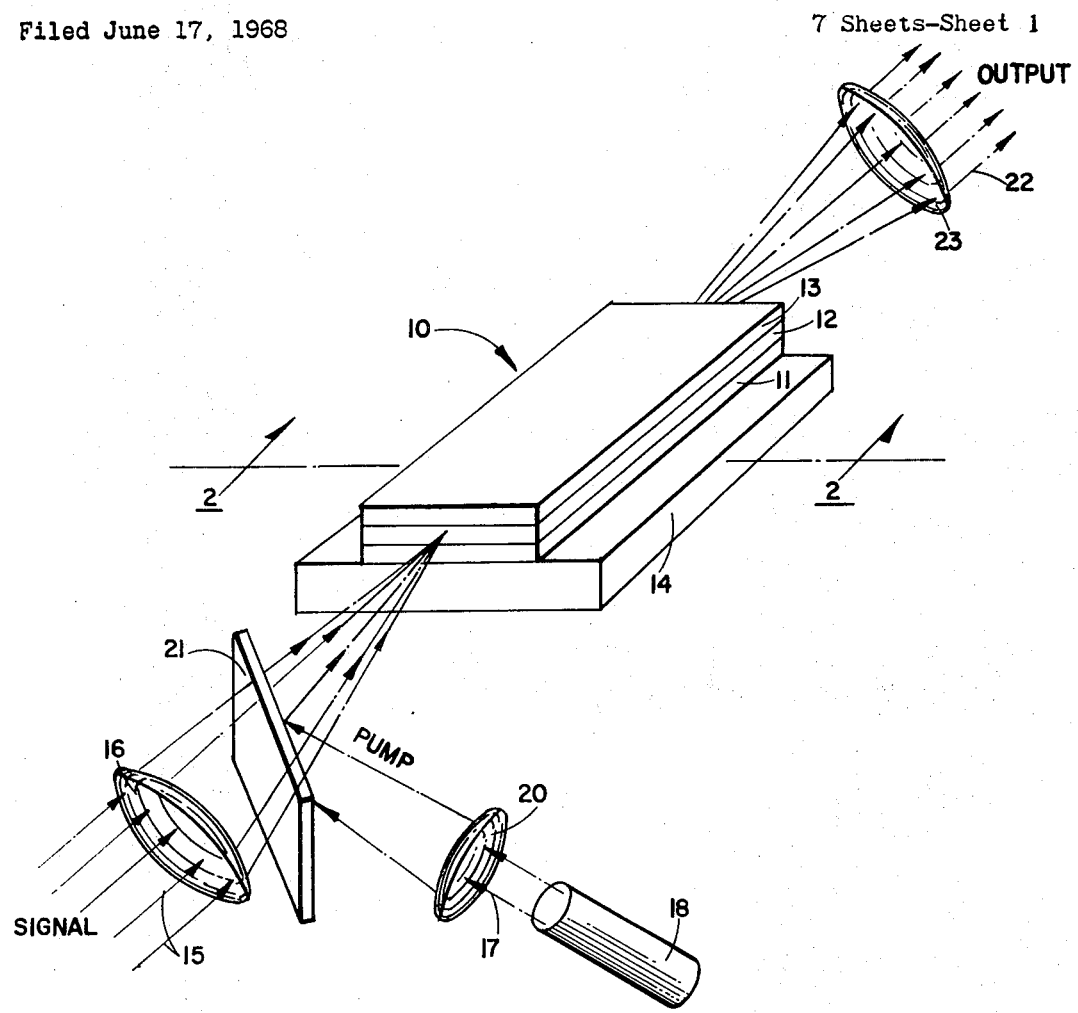
FIG. 1 is a perspective view of a preferred embodiment of the inventive travelling wave optical parametric device utilizing a three-layer dielectric waveguide.
Figure 2:
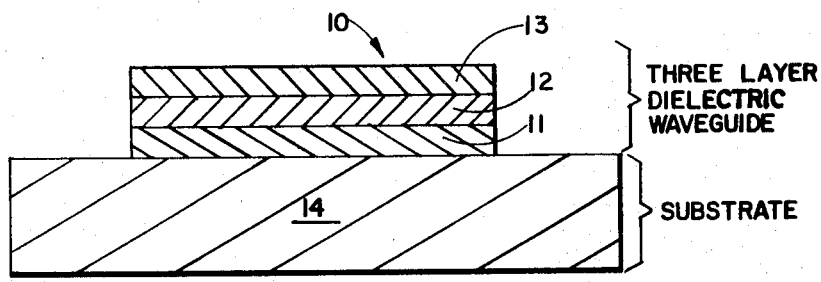
FIG. 2 is a sectional view of the parametric device illustrated in FIG. 1, as seen generally along the line 2—2 thereof.

Shown in FIGS. 1 and 2 is a typical embodiment of the inventive optical parametric device 10 comprising a dielectric waveguide having three layers 11, 12, and 13, at least one of which utilizes a material exhibiting nonlinear susceptibility. As illustrated, dielectric waveguide 10 is disposed atop a substrate 14, however, the invention is not so limited; one of the waveguide layers itself may comprise the substrate, or the substrate may be dispensed with completely.

By appropriate selection of the dimensions and of the refractive index profile, in a manner to be described hereinbelow, parametric device 10 can be made to propagate at the same phase velocity $V_p$ light of frequencies related by the equation:

$$\omega_s \pm \omega_p = \omega_i \quad (1)$$

wherein $\omega_s$ is the signal frequency, $\omega_p$ is the pump frequency and $\omega_i$ is the sideband or idler frequency of the device. (As used throughout this application, the term frequency means angular frequency $\omega$, where $\omega = 2\pi f$, and $f$ is the frequency of interest.) Equation 1 together with the requirement that light at frequencies $\omega_s$, $\omega_p$, and $\omega_i$ all be propagated with the same phase velocity constitute the conditions for travelling wave parametric interaction.

Referring still to FIG. 1, a signal 15 may be introduced into parametric device 10 by means of lens 16. Pump energy 17 provided by an appropriate source 18, typically a laser, may be introduced into parametric device 10 via lens 20 and dichroic mirror 21. A dichroic mirror is one which reflects light at some wavelengths, in this case $\omega_p$, and transmits light at other wavelengths, in this instance $\omega_s$. Output light 22 from optical parametric device 10 may be focused onto a detector or other utilization device (not shown) by means of lens 23. An output may be taken at either $\omega_s$ or $\omega_i$, and another dichroic mirror (not shown) may be used to separate light at the output frequency from other light (e.g., at pump frequency $\omega_p$) emergent from device 10.

In accordance with the present invention, it has been found that the parametric frequency and phase velocity conditions may be achieved by appropriate selection of the refractive index profile and dimensions of dielectric waveguide 10. The refractive index profile refers to the relative thickness and index of refraction of the three layers 11, 12 and 13 which comprise device 10. For convenience in the illustrative examples set forth herein, the refractive index profiles are normalized, with the thickness of intermediate layer 12 designated as D. Control of the refractive index profile in turn effects the dispersion characteristics of dielectric waveguide 10, in a manner which permits the phase match conditions to be met.

The graphs of FIGS. 3–6 inclusive illustrate the dispersion characteristics of four typical dielectric waveguides 10, the refractive index profiles of which also are illustrated in the respective figures. For convenience of calculation, the dispersion curves set forth in the graphs were prepared assuming an infinite width for waveguide 10, and neglecting dispersion of the material. The cases are typical only, the invention not being limited to parametric devices having the refractive index profiles illustrated.

Figure 3:
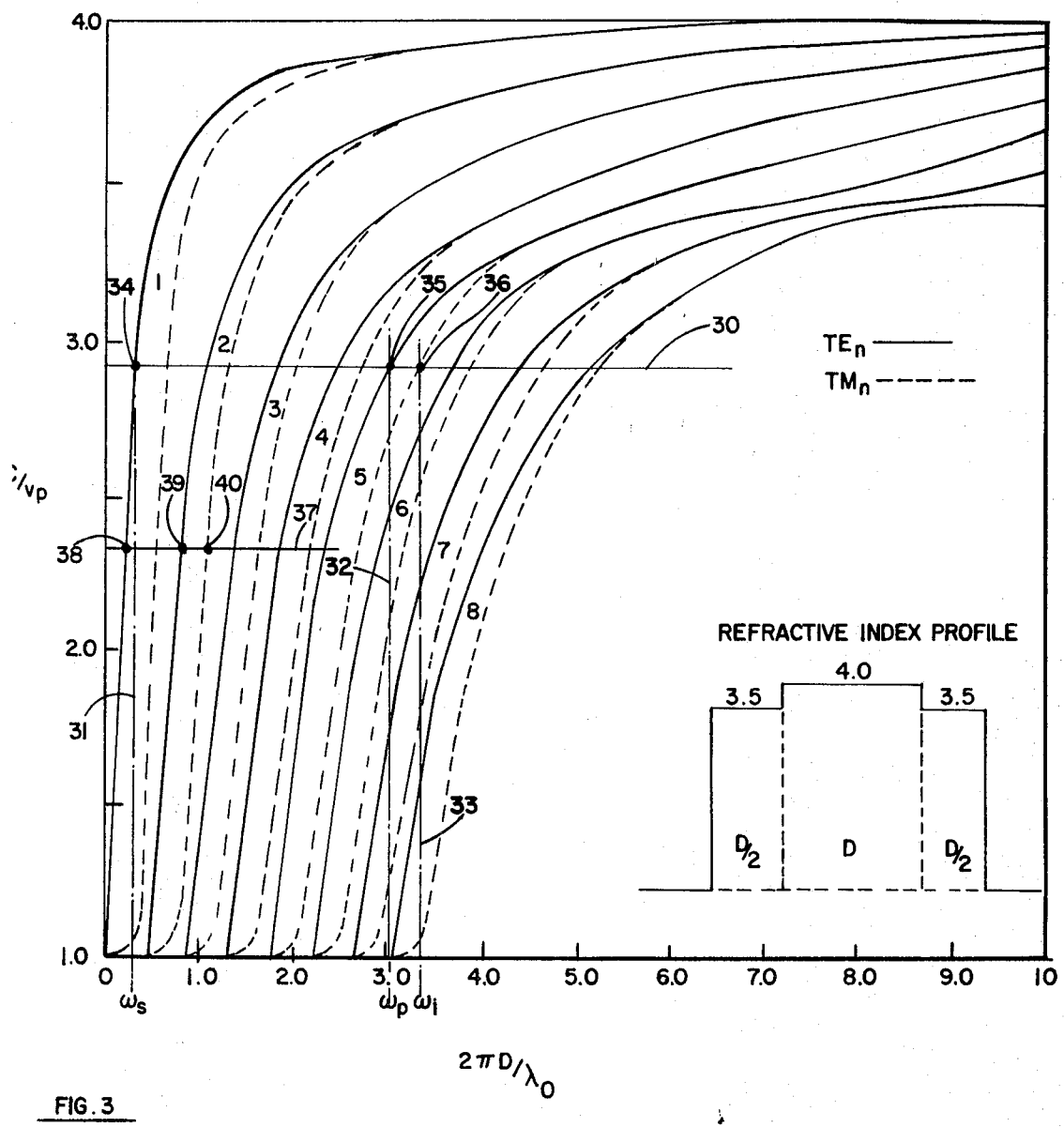
FIGS. 3, 4, 5, and 6 are graphs illustrating the dispersion characteristics of four typical dielectric waveguides; the refractive index profile of the corresponding waveguide is shown in each figure.

Referring first to FIG. 3, the dispersion curves illustrated are characteristic of a parametric device 10 in which the intermediate layer 12 has a thickness D and an effective refractive index of 4.0. Layers 11 and 13 each have a thickness $D/2$, and an effective refractive index of 3.5. Such a refractive index profile is characteristic of a waveguide 10 wherein layer 11 comprises GaAs, layer 12 comprises Ge, and layer 13 comprises GaAs, and wherein layer 12 is twice as thick as either of layers 11 and 13. Dispersion curves for the $TE_n$ and $TM_n$ modes (where $n = 1, 2, 3 \ldots$ represents mode order) are shown in FIG. 3.

It will be appreciated that in FIG. 3 the ordinate is specified in dimensionless units of $C/V_p$, where C is the velocity of light in vacuo and $V_p$ is the phase velocity of light propagated within device 10. $C/V_p$ thus represents the effective waveguide refractive index. The abscissa of the graph in FIG. 3 is given in dimensionless units of $2\pi D/\lambda_0$ where $\lambda_0$ is the wavelength in free space. Thus, the units along the abscissa effectively represent frequency of light propagated by the waveguide.

The loci of constant phase velocity is represented by a horizontal line (e.g., line 30) parallel to the abscissa of FIG. 3. Thus to achieve travelling wave parametric interaction, a signal and pump must be introduced into device 10 in appropriate modes such that they will be propagated with the same phase velocity and so that the sideband frequency ($\omega_i = \omega_s \pm \omega_p$) itself will be a frequency capable of propagation within the waveguide at the same phase velocity. These characteristics are illustrated typically by lines 31, 32 and 33 in FIG. 3, which lines represent respectively frequencies $\omega_s$, $\omega_p$, and $\omega_i = \omega_p + \omega_s$. The frequencies are selected so that they mutually intersect respective dispersion curves at points 34, 35, and 36 all lying along line 30 of constant phase velocity. Note that the horizontal distance along line 30 between the ordinate axis and point 34 (which distance represents the frequency $\omega_s$) is equal to the horizontal distance along line 30 between points 35 and 36 (which distance represents the frequency difference $\omega_i - \omega_p = \omega_s$).

In the illustrative example just given, the signal is in the $TE_1$ mode, the pump is in the $TE_5$ mode and the sideband is in the $TM_5$ mode. In general, it has been found that for effective parametric interaction utilizing device 10, the signal and pump should be of different order (i.e., $n$ should be different for the signal and for the pump), while the pump and sideband should be of different kind (e.g., one TE and the other TM) but of the same mode order (that is, $n$ should be the same for pump and sideband). These conditions are met in the above example.

Referring still to FIG. 3, it may be seen that a few other combinations of frequencies and modes exist at which travelling wave parametric interaction may occur. Thus in the example above points 35 and 36 may be interchanged, with the pump being introduced in the $TM_5$ mode at $\omega_p$, giving rise to an idler at $\omega_i=\omega_p-\omega_s$ in the $TE_5$ mode. As another example, line 37 also represents loci of constant phase velocity, along which line lie intercept 38 with the $TE_1$ mode dispersion curve, and intercepts 39 and 40 respectively with the $TE_2$ and $TM_2$ mode dispersion curves. The distance between points 39 and 40 equals the distance between the ordinate axis and point 38, thus meeting the travelling wave parametric conditions. In this example, the signal (at a normalized frequency $\omega_s=0.3$) may be introduced in the $TE_1$ mode and the pump (at a normalized frequency $\omega_p=0.7$) in the $TE_2$ mode; the resultant sideband (at a normalized frequency $\omega_i=\omega_s+\omega_p=1.0$) will be in the $TM_2$ mode.

Referring still to FIG. 3, it may be seen that each of the illustrated dispersion curves is asymptotic at an effective waveguide refractive inder value $C/V_p$ of approximately 4. Note that this value corresponds to the highest value of refractive index exhibited by any of the layers of device 10. In the example illustrated, the value corresponds to the refractive index of central layer 12. Note also in FIG. 3 that a number of the higher order modes (particularly those with values of $n>4$) exhibit an inflection at a $C/V_p$ value of about 3.5, generally corresponding to the refractive index value of waveguide layers 11 and 13.

Figure 4:
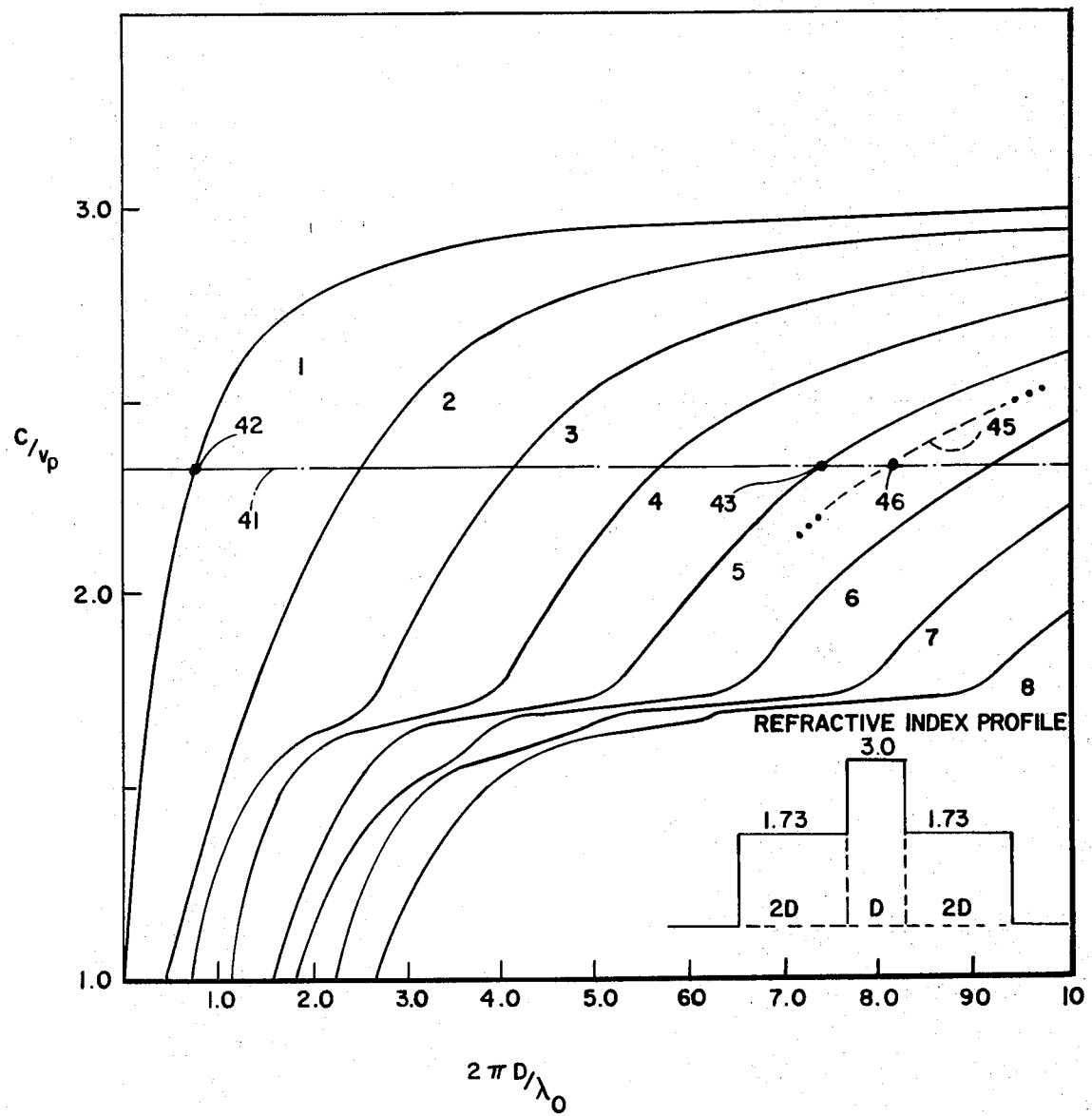

The occurrence of a dispersion curve asymptotic at an effective waveguide refractive index value equal to the highest refractive index value of any of the waveguide layers, together with inflection of the dispersion curves (particularly of higher mode order) at a $C/V_p$ value equal to that of the other layers of the waveguide is even more graphically illustrated in the curve of FIG. 4.

Shown in FIG. 4, a graph of the dispersion characteristics of a planar dielectric waveguide having a refractive index profile as also illustrated therein. In this example, intermediate layer 12 has a thickness D and a refractive index of 3.0, while adjacent layers 11 and 13 each have a thickness twice that of intermediate layer 12 and a refractive index value of 1.73. Such a waveguide may be fabricated utilizing glass as the material for layers 11 and 13, and GaP as the material for intermediate layer 12.

For simplicity, FIG. 4 includes only dispersion curves for $TE_n$ modes; the $TM_n$ modes exhibit asymptote and inflection characteristics similar to those shown for the $TE_n$ modes. In FIG. 4, it is clearly evident that the planar dielectric waveguide dispersion curves are asymptotic at a $C/V_p$ value corresponding to that of the highest value of index of refraction (here 3.0) exhibited by any of the layers in the waveguide. It is also apparent that the dispersion curves exhibit a major inflection at a $C/V_p$ value (here 1.73) corresponding to that of the lower index of refraction value of the remaining waveguide layers.

Figure 5:
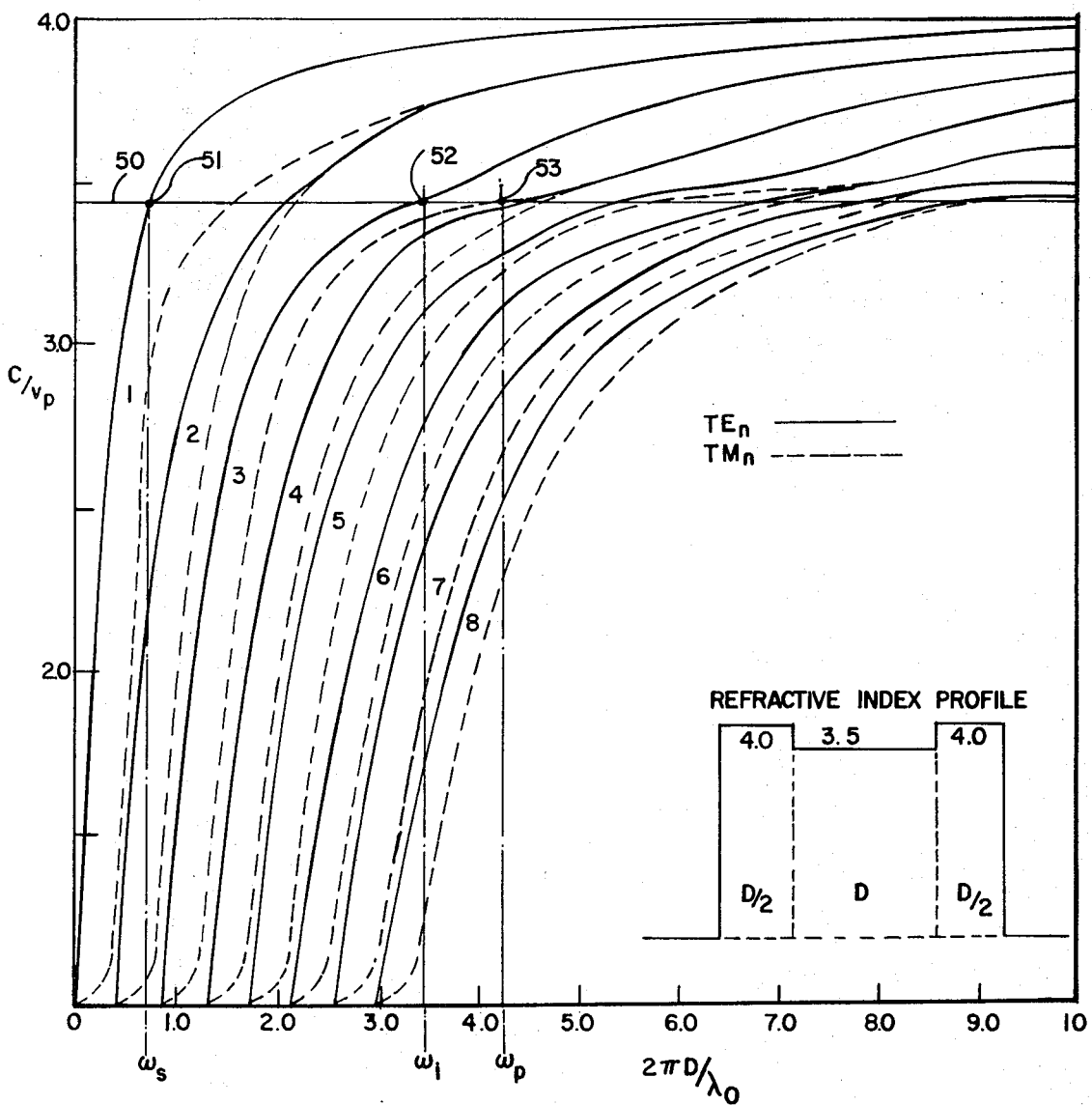

In the optical parametric devices exemplified by FIGS. 3 and 4, layers 11 and 13 exhibit index of refraction values equal to one another but lower than that of the intermediate layer 12. Referring now to FIG. 5, there is shown a graph of the dispersion curves for both the $TE_n$ and $TM_n$ modes for a planar dielectric waveguide having a refractive index profile wherein intermediate layer 12 has a refractive index value less than the value of outer layers 11 and 13. In this case, layer 12 has a refractive index value 3.5 and a thickness D, while layers 11 and 13 each have a thickness $D/2$ and a refractive index value of 4.0. Again it is evident that the dispersion curves tend to be asymptotic at an effective waveguide refractive index value $C/V_p$ of 4.0, equal to the highest value of refractive index exhibited by any of the waveguide layers. A set of inflections in the dispersion curves also is apparent at a $C/V_p$ value of approximately 3.5, corresponding to the lower refractive index value of intermediate layer 12.

Figure 6:
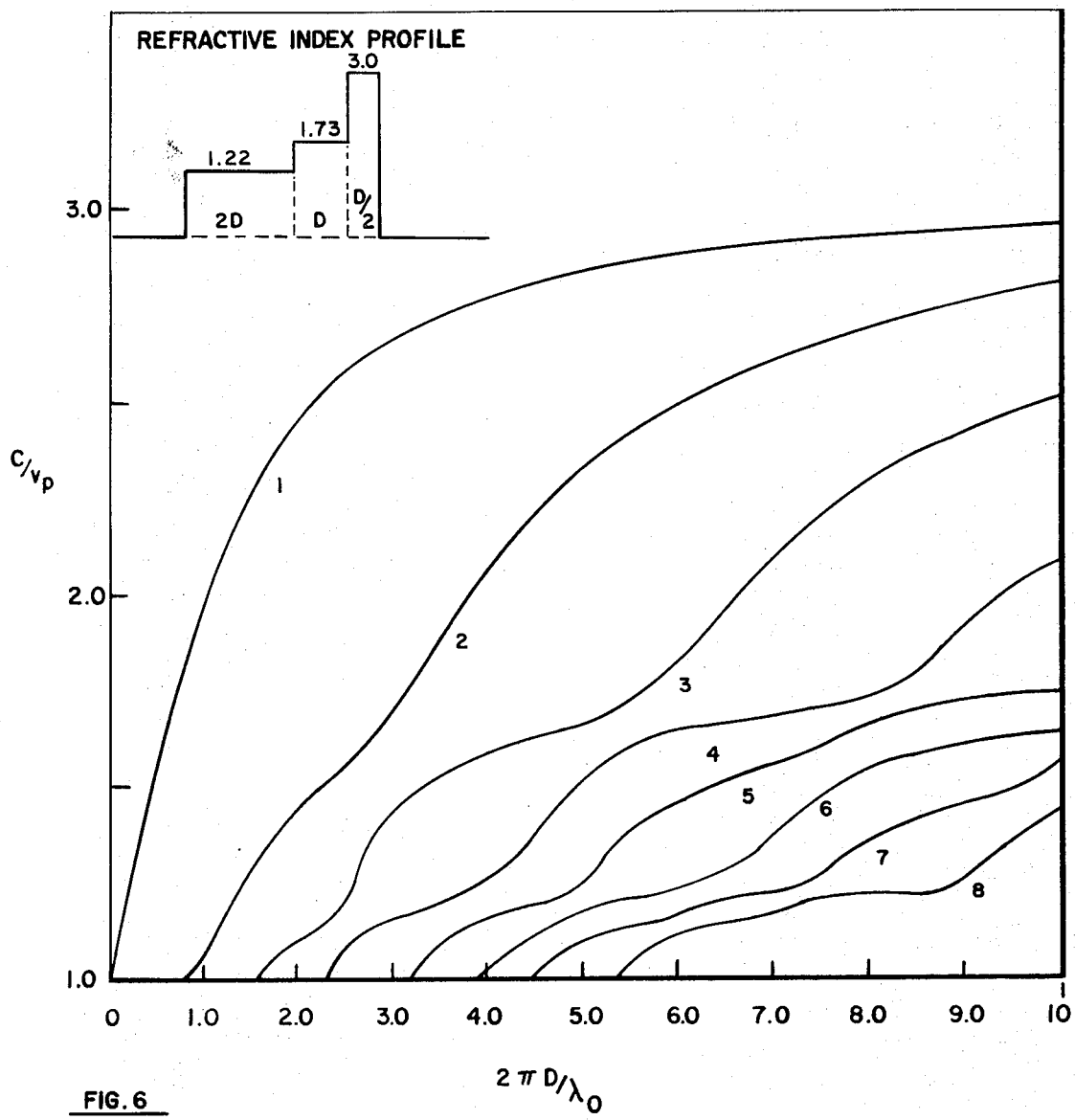

The examples of FIGS. 3, 4, and 5 all have the common characteristic that top and bottom waveguide layers 11 and 13 exhibit the same index of refraction value, while central layer 12 has a different index of refraction. The graph of FIG. 6 illustrates the dispersion curves for a planar dielectric waveguide having a refractive index profile wherein each of the three waveguide layers has a different value of refractive index. As shown, intermediate layer 12 has a thickness D and a refractive index value of 1.73, layer 11 has a thickness 2D and a refractive index value of 1.22, and layer 13 has a thickness $D/2$ and a refractive index value of 3.0.

In FIG. 6, dispersion curves for only the $TE_n$ modes are given; the dispersion curves for the $TM_n$ modes exhibit similar inflection characteristics. As evident (in FIG. 6) the dispersion curves tend to be asymptotic at an effective waveguide refractive index value $C/V_p$ of approximately 3, equal to the highest value of index of refraction exhibited by any of the waveguide layers. Moreover, the dispersion curves, particularly those of the higher orders, exhibit two sets of inflections, the first set occurring at a $C/V_p$ value of approximately 1.7, the second set occurring at a $C/V_p$ value of approximately 1.22. That is, dispersion curve inflections are exhibited at $C/V_p$ values equal to each the lesser values of index if refraction exhibited by the waveguide layers.

The effect of layer thickness on the shape of the waveguide dispersion curves is illustrated typically in FIG. 4. Note therein that for values of $C/V_p$ greater than about 1.73 the dispersion curves for the different mode orders (i.e., for different values of $n$) are widely spaced. Conversely, for values of $C/V_p$ less than 1.73 the dispersion curves for different orders are closely spaced. This results from the fact that at $C/V_p$ values above 1.73 the light is bound substantially within the central layer 12 having a refractive index of 3.0 and a thickness D. At $C/V_p$ values less than 1.73, the light is bound substantially within all three layers 11, 12 and 13, these layers having a total thickness 3D. In general, the thicker the waveguide binding the light, the narrower the spacing between dispersion curves of different mode orders.

A further example of the effect of thickness on the spacing between dispersion curves is illustrated by FIG. 6. As seen therein, for $C/V_p$ values greater than 1.73 the light is substantially bound by layer 13 having thickness $D/2$; the dispersion curve spacing in this region ($C/V_p>1.73$) is quite large. For values of $C/V_p$ between 1.22 and 1.73 the light is substantially bound within waveguide layers 12 and 13, having a total thickness of 1.5D; the dispersion curves in this region ($1.22<C/V_p<1.73$) are more narrowly spaced than in the region $C/V_p>1.73$. Finally, for $C/V_p$ values less than 1.22, the light is bound substantially by the entire guide, with total thickness 3.5D; the dispersion curves for the various mode orders, in the region $C/V_p<1.22$, thus are spaced more narrowly than is the regions where $C/V_p>1.22$.

It will be appreciated from the foregoing discussion that the general shape and spacing between the various $TE_n$ and $TM_n$ dispersion curves for planar dielectric waveguides may be controlled by appropriate selection of the refractive index profile. That this is so implies a corresponding control over the selection of frequencies and modes at which travelling wave optical parametric interaction can occur in a dielectric waveguide. Recall from the discussion hereinabove in conjunction with FIG. 3 that for a dielectric waveguide of specfic refractive index profile only a few frequency and mode combinations exist at which parametric interaction is possible. By controlling the refractive index profile, by appropriate material and thickness selection, a very wide selection of frequency combinations useful for parametric interaction is possible.

The manner in which selection of refractive index profile permits a wide selection of useful frequencies is typified by the comparison between FIGS. 3 and 4. Note in FIG. 4 that line 41 again represents loci of constant phase velocity. Line 41 of constant phase velocity intercepts respectively with the dispersion curve for the $TE_1$ mode at point 42 corresponding to frequency $\omega_s=0.6$, with the dispersion curve for the $TE_5$ mode at point 43 corresponding to frequency $\omega_s=7.6$, and with the $TM_5$ mode curve 44 at point 45 corresponding to $$\omega_i = \omega_p + \omega_s = 8.2$$

These frequencies at which parametric interaction can occur in a dielectric waveguide having the refractive index profile illustrated in FIG. 4 may be directly compared with the corresponding frequencies illustrated in conjunction with line 30 in FIG. 3 and discussed hereinabove. In each case, the signal is introduced in the $TE_1$ mode, the pump is introduced in the $TE_5$ mode and the idler exists in the $TM_5$ mode; notice that by changing the waveguide refractive index profile a set of frequencies substantially different than that illustrated in FIG. 3 may be utilized for parametric interaction.

In addition to allowing selection of parametric interaction frequencies, control of the refractive index profile of device 10 also suggests the possibility of broadband parametric interaction. This may be accomplished by making use of the fact that the slopes of the dispersion curves for a particular dielectric waveguide in the inflection regions are different in different modes. This situation is typified by the graph of FIG. 5, wherein line 50 represents a line of constant phase velocity which intersects the $TE_3$ and $TM_3$ curves (among others) adjacent their inflection points. Note in FIG. 5 that adjacent the intercept 51 with line 50, the $TE_1$ dispersion curve exhibits a relatively steep slope, however, adjacent the intercept points 52 and 53 with line 50, the $TE_3$ and $TM_3$ mode dispersion curves exhibit more gradual slopes. Comparison of these slopes is simplified reference to FIG. 7.

FIG. 7 shows an enlarged fragmentary view of the dispersion curves for the $TE_1$, $TE_3$ and $TM_3$ modes for a dielectric waveguide having the refractive index profile shown in FIG. 5. In this instance, the signal is assumed to be introduced in the $TE_1$ mode, the pump in the $TM_3$ mode, and the idler (at $\omega_i = \omega_p - \omega_s$) introduced in the $TE_3$ mode. In the graph of FIG. 7, the dispersion curve 53' for the $TM_3$ mode is drawn exactly as shown in FIG. 5 but in an enlarged scale. The dispersion curve 52' for the $TE_3$ mode, is plotted multiplied by the frequency ratio $\omega_p/\omega_i$, while the $TE_1$ mode dispersion curve 51' is shown plotted multiplied by $\omega_p/\omega_s$. It will be appreciated that by plotting the curves in this fashion, the slopes may be directly compared in the region around the line of constant phase velocity 50. As may be seen from FIG. 7, there exists a region along which the three curves are substantially confluent. This being the case, for a constant pump frequency $\omega_p$, parametric interaction can occur for a range of signal frequencies $\Delta\omega_s$ as shown in the graph. This permits the realization of broadband operation by appropriate selection of waveguide refractive index profile to achieve the slope-matched condition described. Of course, such broadband operation is not limited to that obtained with a waveguide having the refractive index profile illustrated in FIG. 5, which waveguide is illustrative only of the principle employed.

Yet another degree of control over the dispersion characteristics of an optical parametric device such as that illustrated in FIG. 1 may be accomplished by utilizing a birefringent material for one or more of the layers 11, 12 and 13. For light propagated along others than the optic axis of the material, a birefringent material exhibits different refractive indices dependent upon the polarization orientation of the light. This characteristic of birefringence is illustrated by the family of dispersion curves shown in FIG. 8 for a planar slab of birefringent material.

Figure 8:
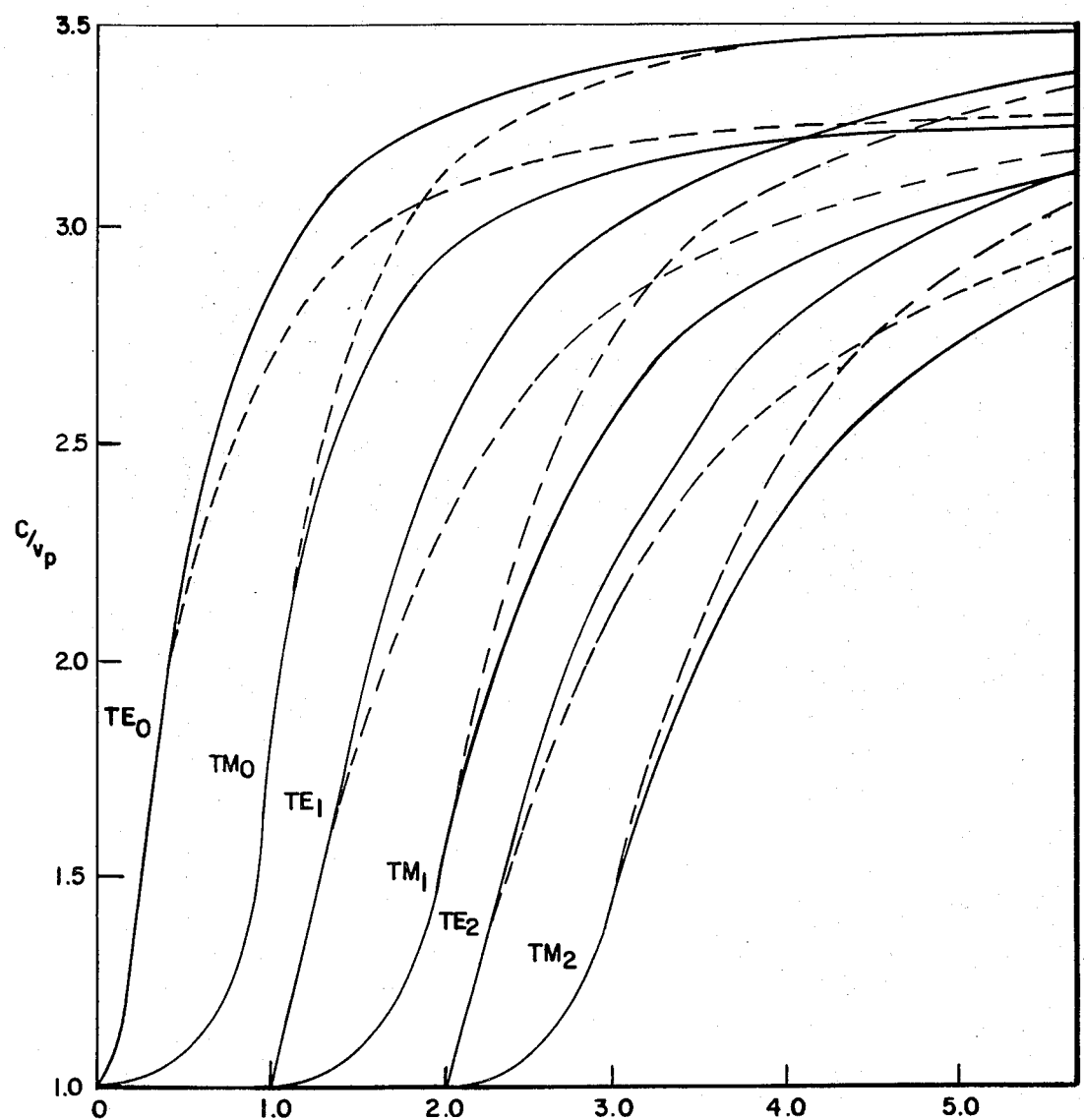
FIG. 8 is a graph showing the dispersion characteristics of a planar dielectric slab of a birefringent material, which material may be incorporated as one or more of the layers of the optical parametric device shown in FIG. 1.

Referring now to FIG. 8, the dispersion curves illustrated represent the effective index of refraction $C/V_p$ seen by light propagating through a planar dielectric slab of birefringent material. In the example illustrated, the material is assumed to comprise a positive uniaxial crystal with its optic axis in the direction normal to the top surface of the slab. The crystal exhibits an ordinary refractive index value $N_c = N_o = 3.3$ and an extraordinary refractive index value $N_c = N_e = 3.5$.

Dispersion curves for light introduced in the $TE_n$ and $TM_n$ modes are shown in FIG. 8. Note that light introduced in a TE mode will be propagated with an effective refractive index asymtote of 3.5, as illustrated by the solid TE curves. In contradistinction, light introduced in a TM mode will be propagated with an effective waveguide refractive index asymtote of 3.3, represented by the solid TM curves. If a negative uniaxial birefringent crystal (e.g., one in which $N_e = 3.3$, $N_o = 3.5$) were substituted for the positive one, the characteristics shown in FIG. 8 would be reversed. That is, light introduced in a TE mode would be propagated at an effective refractive index asymtote of 3.3 (represented by the dashed TE curves in FIG. 8) while light in a TM mode would be propagated at an effective refractive index asymtote of 3.5 (represented by the dashed TM curves). A similar interchange of characteristics would be experienced if the optic axis were rotated from normal to the top of planar dielectric slab to parallel therewith, but still perpendicular to the direction of propagation.

A birefringent material may be utilized for one or more layers of the optical parametric device illustrated in FIGS. 1 and 2. By way of example, suppose layers 11 and 13 each comprised a highly birefringent nonlinear material such as cinnabar ($\alpha$-HgS). Cinnabar is birefringent, exhibiting an ordinary index of refraction of 2.8, and an extraordinary index of refraction of 3.1. If layer 12 utilized a non-birefringent material having an index of refraction of about 3.0 (comprising e.g., GaP) the resultant device would exhibit different refractive index profiles dependent on whether light in a TM or a TE mode were introduced into the waveguide. Thus, if the optic axis of the $\alpha$-HgS were to lie normal to layers 11 and 13, light introduced in a TE mode would see the effective index profile illustrated in FIG. 9a. However, light introduced in a TM mode would see the different index of refraction profile illustrated in FIG. 9b.

Figure 9A:
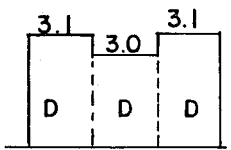
FIGS. 9a and 9b show effective refractive index profiles of a dielectric waveguide incorporating two birefringent layers.
Figure 9B:
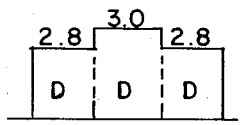

Since the dispersion curves for the two refractive index profiles illustrated in FIGS. 9a and 9b will be different, it is apparent that yet another degree of freedom has been provided for selection of frequencies and modes for interaction in a parametric device. This is so since a signal introduced in a TE mode will be propagated at a phase velocity determined by the dispersion curve associated with the refractive index profile of FIG. 9a, while a pump introduced in a TM mode will be propagated at a phase velocity determined by the dispersion curve associated with the profile exhibited by FIG. 9b. Since the waveguide dispersion characteristics are different for the two profiles, it may be possible to achieve parametric interaction at a set of frequencies at which, were the signal and pump both to see the same refractive index profile, parametric interaction would not take place.

In the immediately preceding example, cinnabar is both birefringent and nonlinear. Alternatively, a birefringent material which is not nonlinear may be used for one or more layers 11, 12 and 13, so long as the material used for at least one of the other layers is itself nonlinear. Thus, for example, calcite ($CaCl_3$), a linear, highly birefringent crystal, could be utilized for one or two of the layers of device 10, in conjunction with a nonlinear material used for another of the layers.

Travelling wave parametric interaction in a device such as that shown in FIGS. 1 and 2 requires that the pump and signal be introduced in appropriate modes. To this end, the waveguide configurations illustrated in FIGS. 10 and 11 typify a manner in which mode control of the entrant light may be accomplished.

Referring to FIG. 10, waveguide 60 comprises substrate 61 and first, second and third layers 62, 63 and 64, which layers correspond generally to layers 11, 12 and 13 in the embodiment of FIG. 1. At one end of device 60 there is provided a tapered region 65 flaring out from edge 66 to a maximum width less than that of the overall width of layers 62, 63 and 64. Proper proportioning of the taper rate of curved region 65 will result in mode conversion of light entrant into device 60. For example, conversion from the $TE_{01}$ mode to the $TE_{31}$ mode may be accomplished with such a structure.

Similarly, the device shown in FIG. 11 also permits mode conversion of light entrant into a dielectric waveguide. Here, the device comprises a waveguide 70 having substrate 71 and layers 72, 73, and 74, corresponding respectively to layers 11, 12 and 13 of the device shown in FIG. 1. One end of layer 72 extends beyond the corresponding ends of layers 73 and 74, to form a tapered region 75 having a pointed end 76. A device of a type shown in FIG. 10 may permit mode conversion, for example, from the $TE_{10}$ mode to the $TE_{30}$ mode.

Some of the devices herein described typically may be fabricated of single crystal material epitaxially deposited on a single crystal substrate using known chemical vapor deposition techniques. Thus, in the embodiment of FIG. 1, substrate 14 may comprise sapphire, chrysoberyl, BeO, MgO or the like. Layers 11, 12 and 13 then may comprise respectively gallium arsenide, gallium phosphide, and gallium arsenide. Deposition of GaAs or GaP atop a single crystal electrically insulating substrate is described in the copending application to Manasevit, entitled "Epitaxial Composite and Method of Making," Ser. No. 705,213, assigned to North American Rockwell Corporation, assignee of the present invention.

Other materials also may be used for device 10. For example, the epitaxial composite comprising a substrate of monocrystalline electrically insulating material such as BeO, a layer of a semiconductor such as Ge, and layer of a III–V material such as GaAs, may be employed. Such an epitaxial composite is described in the copending application to Coker et al., entitled "Multilayer Semiconductor Heteroepitaxial Structure," Ser. No. 582,955, also owned by North American Rockwell Corporation, assignee of the present invention. Of course, there is no requirement that layers 11, 12 and 13 be epitaxial, or even that they be single crystal. However, optimum results have been obtained when at least the nonlinear layer is single crystal.

For illustrative simplicity, the examples of the inventive parametric device shown in the figures are three-layered. However, the invention is not so limited, and waveguide structures having more or less than three layers may be used, with similar control over the dispersion characteristics obtained by appropriate selection of refractive index profile.

The thickness and width of the inventive parametric device are noncritical. The width dimension has only limited effect on the shape of the waveguide dispersion curves so long as the width-to-height ratio is greater than about 10. At width-to-height ratios of less than 10, the dominant controlling factor is the cross-sectional area (i.e., width times height) of the guide. As this area decreases, the effective refractive index of the guide also decreases. However, significant reduction in parametric interaction does not occur until this area becomes less than $(\lambda/4)^2$.

Another mode of control over the inventive parametric device may be achieved by utilizing materials for layers 11, 12, and 13 the index of refraction of which will change due to some external influence. Thus a material (for example, GaAs) may be selected which exhibits a change in refractive index with temperature. Since the waveguide dispersion characteristics are dependent on refractive index profile, a temperature change will effect a corresponding change in dispersion and hence a change in the frequencies at which parametric interaction will occur. Similar frequency control of the inventive optical parametric device may be achieved by utilization of materials which exhibit a change in refractive index under influence of pressure, electric field of magnetic field.

Although the invention has been described and illustrated in detail, it is to be clearly understood that the same is by way illustration and example only and is not to be taken by way of limitation, the spirit and scope of this invention being limited only by the terms of the appended claims.

1. As an optical parametric device, a dielectric waveguide comprising a plurality of layers at least one of which exhibits nonlinear susceptibility, the dispersion of said guide being characterized by a plurality of curves of effective waveguide refractive index as a function of frequency, the index of refraction profile of said waveguide being selected so that three of said curves intersect a line of constant phase velocity respectively at frequencies $\omega_s, \omega_p$ and $\omega_i$ related by the equation $\omega_p \pm \omega_s = \omega_i$, said device further comprising means for controlling the modes of said $\omega_s$ and $\omega_p$ frequencies and wherein said means for controlling said modes comprises a tapered end of said waveguide.

2. A device as defined in claim 1, wherein:
at least one of said layers comprises a birefringent material, said waveguide thus exhibiting different refractive index profiles and providing different kinds of modes of operation.

3. A device as defined in claim 1, wherein:
the refractive indices of at least two of said layers are different, thereby causing inflections in at least some of said curves.

4. A device as defined in claim 3, wherein:
the intersections of the line of constant phase velocity with said curves occur adjacent said inflections; and the slopes of said curves adjacent said intersections are confluent.

5. A device as defined in claim 1, wherein:
one of said layers is a substrate of a monocrystalline electrically insulating material, and another of said layers is epitaxially disposed on said substrate.

6. A device as defined in claim 5, wherein:
each of said layers is monocrystalline which are epitaxially disposed on each adjacent underlying layer and one of said layers is epitaxially disposed on the substrate.

References Cited

UNITED STATES PATENTS 3,297,875  1/1967  Garwin et al. _____ 330—4.5
3,430,061  2/1969  Smith _____ 307—88.3

RODNEY D. BENNETT, Jr., Primary Examiner

D. C. KAUFMAN, Assistant Examiner

U.S. Cl X.R.

307—88.3